(12) United States Patent
Clevenger

(10) Patent No.: US 7,002,990 B2
(45) Date of Patent: *Feb. 21, 2006

(54) COMMUNICATION SYSTEM FOR DEDICATED AND SWITCHED COMMUNICATIONS

(75) Inventor: Claton F. Clevenger, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/042,859

(22) Filed: Jan. 25, 2005

(65) Prior Publication Data

US 2005/0129004 A1    Jun. 16, 2005

Related U.S. Application Data

(63) Continuation of application No. 09/691,008, filed on Oct. 18, 2000, now Pat. No. 6,870,857.

(51) Int. Cl.
*H04J 3/16* (2006.01)

(52) U.S. Cl. .................. 370/467; 370/468; 370/465; 370/352

(58) Field of Classification Search ............... 370/467, 370/468, 230, 401
See application file for complete search history.

(56) References Cited

U.S. PATENT DOCUMENTS

| | | | |
|---|---|---|---|
| 5,251,209 A | 10/1993 | Jurkevich et al. ............. 370/82 |
| 5,825,780 A | 10/1998 | Christie | |
| 5,850,433 A | 12/1998 | Rondeau | |
| 5,991,301 A | 11/1999 | Christie | |
| 6,181,703 B1 | 1/2001 | Christie | |
| 6,515,985 B1 * | 2/2003 | Shmulevich et al. ........ 370/356 |
| 6,704,327 B1 * | 3/2004 | Gardner et al. ............. 370/467 |

* cited by examiner

*Primary Examiner*—Bob Phunkulh
*Assistant Examiner*—Robert W. Wilson

(57) ABSTRACT

The communication system comprising a dedicated processing system, a call processing system, and an interworking system. The dedicated processing system is configured to generate and transfer a first call setup message. The call processing system is configured to receive and process the first call setup message to select a first identifier, generate and transfer a first instruction indicating the first identifier and a dedicated communication, receive and process a second call setup message to select a second identifier, and generate and transfer a second instruction indicating the second identifier and a switched communication. The interworking system is configured to receive the first instruction, the second instruction, and a bundled communication including the dedicated communication and the switched communication. In response to the first instruction, the interworking system separates the dedicated communication from the switched communication and converts the dedicated communication into first packets including the first identifier. In response to the second instruction, the interworking system converts the switched communication into second packets including the second identifier and transfers the first packets and the second packets.

20 Claims, 7 Drawing Sheets

COMMUNICATION SYSTEM FOR DEDICATED AND SWITCHED COMMUNICATIONS

RELATED APPLICATIONS

This patent application is a continuation of patent application Ser. No. 09/691,008, entitled "Communication System for Dedicated and Switched Communications," filed on Oct. 18, 2000, now U.S. Pat. No. 6,870,857, and that is hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication systems, and specifically, to a communication system for providing dedicated communications and switched communications over a packet network.

2. Description of the Prior Art

A dedicated communication link is a direct non-switched communication link exclusively dedicated for a customer's use between specified points. Dedicated communication links are typically high capacity multi-channel communication links that provide dedicated services from one or more customer-specified locations to one or more other customer-specified locations. One example of a dedicated communication link is a T-1 digital transmission line having 24 channels that operate at 1.54 megabits per second. Often however, customers desiring dedicated services do not require the full capacity of these multi-channel communication links. In this case, a digital cross connect provides a channel capacity within the multi-channel link for dedicated communications, while the remaining channel capacity is used to carry switched communications. Some examples of the dedicated communications include private line communications between two customer sites, Internet Protocol ("IP") communications for an IP network and frame relay communications for a frame relay network. Some examples of the switched communications include switched voice, video, and data.

Digital cross connects allow dedicated communications and switched communications to be transmitted from the customer premises to a network edge over a single multi-channel communication link. FIG. 1 illustrates an example of a communication system that provides dedicated and switched communication services. On FIG. 1 the customer premise equipment ("CPE") 100 is connected to a digital cross connect 101 by a T-1 communication link 110. The T-1 communication link 110 carries bundled communications including dedicated and switched communications for the CPE 100. The digital cross connect system 101 is provisioned to cross-connect incoming digital signal one ("DS1") communications within a digital signal three ("DS3") communication link to outgoing DS1 communications. The digital cross connect system 101 receives the bundled communications from the CPE 100 as well as other communication links (not shown) in the DS3 format and converts the communications to a DS1 format. The digital cross connect 111 receives the DS 1 communications from the digital cross connect 101 and converts the DS1 format to a digital signal zero ("DS0") format to groom the private line communications, groom the IP communications, groom the frame relay communications, and groom the switched communications. Grooming repackages DS0 communications into different outgoing DS1 communications. The private line communications are then provided to the CPE 105, while the IP communications are provided to the IP network 108, the frame relay communications are provided to the frame relay network 109, and the switched communications are provided to the interworking system 103. Simultaneously the CPE 100 provides a call setup signaling message to the call processor 106, possibly over the signaling link 112. The call processor 106 processes the call setup signaling message from the CPE 100 to generate a routing instruction for the interworking system 103. In response to the routing instruction, the interworking system 103 packetizes the switched communications and transmits the packetized communications over the packet network 104 to the called destination.

SUMMARY OF THE INVENTION

The present invention advances the art by providing a communication system that exchanges both dedicated and switched communications over a packet network. The communication system comprises a dedicated processing system, a call processing system, and an interworking system. The dedicated processing system is configured to generate and transfer a first call setup message for the call processing system. The call processing system is configured to receive and process the first call setup message to select a first identifier and generate and transfer a first instruction indicating the first identifier and a dedicated communication. The call processing system also receives and processes a second call setup message from a customer premise equipment to select a second identifier, and generates and transfers a second instruction indicating the second identifier and a switched communication. The interworking system is configured to receive the first instruction, the second instruction, and a bundled communication that includes the dedicated communication and the switched communication. In response to the first instruction, the interworking system separates the dedicated communication from the switched communication and converts the dedicated communication into first packets including the first identifier. In response to the second instruction, the interworking system converts the switched communication into second packets including the second identifier and transfers the first packets and the second packets over the packet network.

Upon termination of the switched communication, the call processing system receives a call release message from one of the customer premise equipment or the network and processes the call release message to generate a call release instruction for the interworking system to stop packetization of the switched communications. The dedicated communication path, on the other hand, is only torn down following a customer request for reconfiguration or cancellation of the dedicated communication service.

A first advantage of the present communication system is that all customer traffic including switched and dedicated communications are routed over the same network using the same network equipment, resulting in more reliable communication services. A second advantage of the present invention is that dedicated communication circuits are provisioned as trunk groups permitting the call processing system to allocate and reallocate bandwidth using the method for a dialed number call setup. Similarly, a third advantage of the present communication system is that the bundled dedicated and switched communications no longer need to be groomed at the DS0 level to separate individual communications. A fourth advantage of the present communication system is the seamless integration of customer reconfiguration of bandwidth for dedicated services.

In the context of the present invention the first, second, third, fourth, etc. connotations used to reference the messages, the calls, and the devices are used for the purpose of differentiating between different messages, different calls, and different devices and are not used to indicate a message sequence, call sequence or processing sequence.

DETAILED DESCRIPTION OF THE PREFERRED EMBODIMENT

Figure 1:
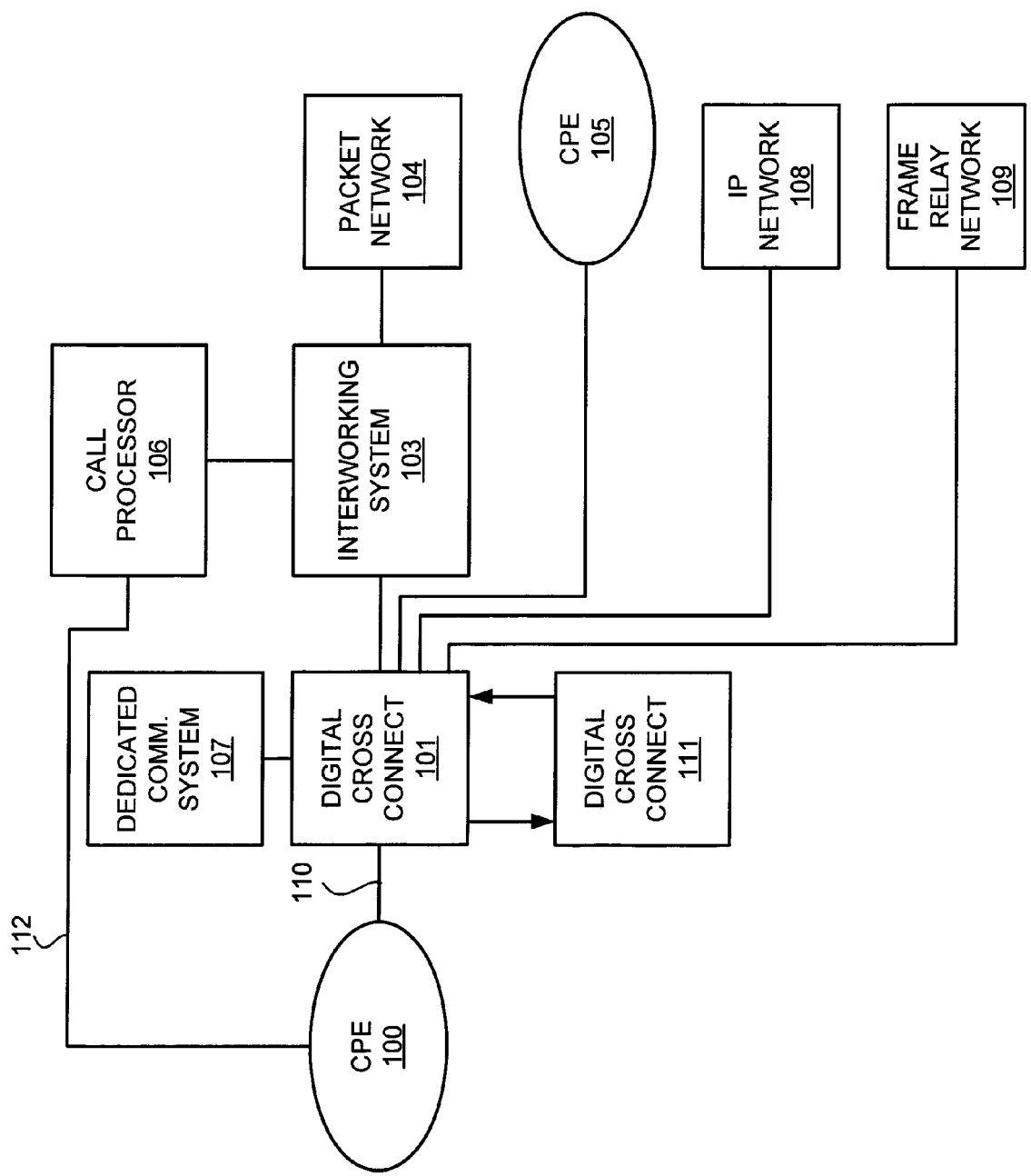
FIG. 1 illustrates an example of a prior art communication system.
Figure 2:
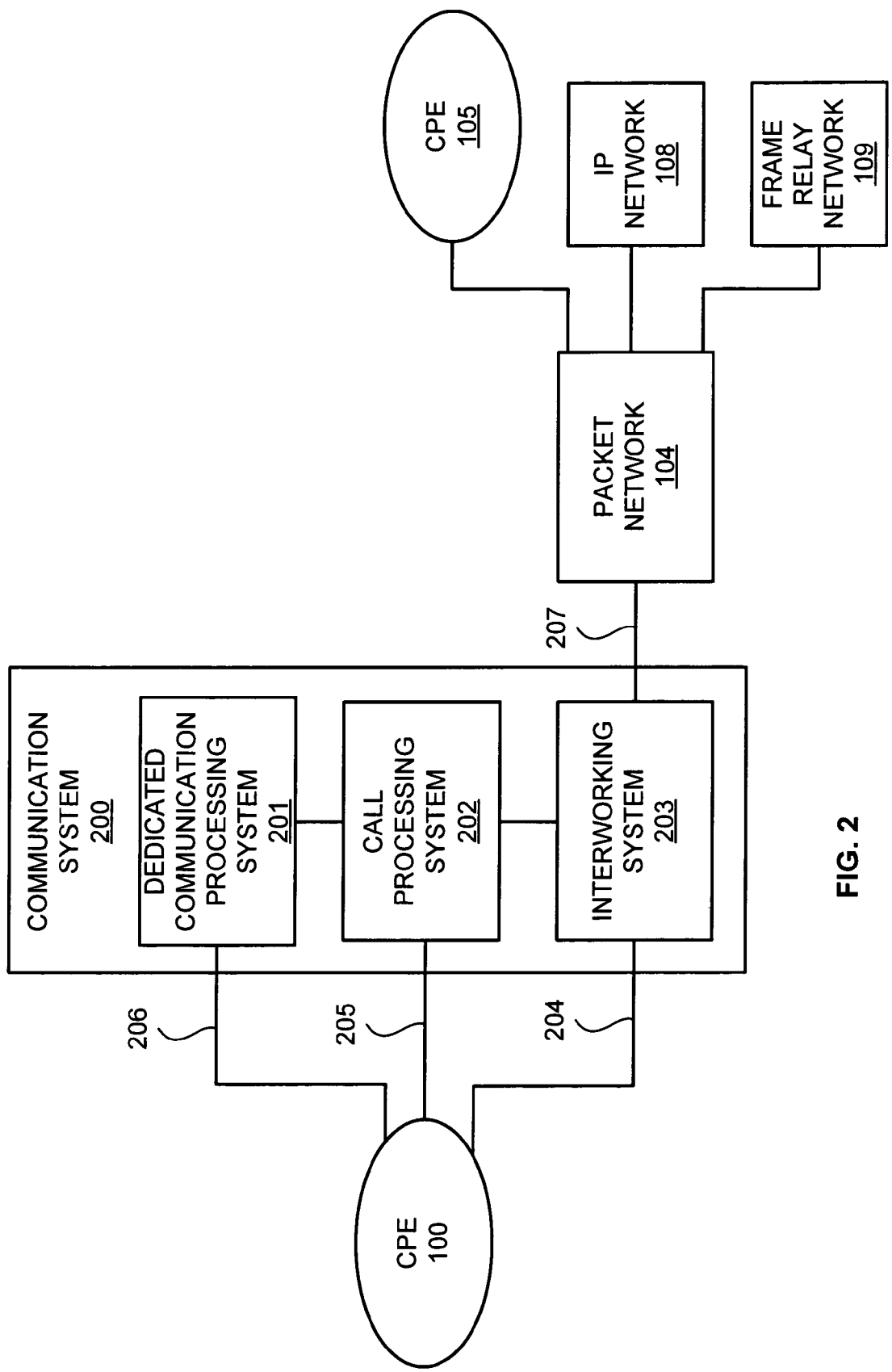
FIG. 2 illustrates an example of a network architecture for a communication system according to the present invention.

Network Architecture FIG. 2:

FIG. 2 illustrates an example of a network architecture for a communication system 200 according to the present invention. FIG. 2 depicts the CPE 100, the communication system 200, the packet network 104, the CPE 105, the IP network 108 and the frame relay network 109. The communication system 200 comprises a dedicated processing system 201, a call processing system 202 and an interworking system 203.

The dedicated communication system 201 is connected to the CPE 100 by a communication link 206. The communication link 206 could be a conventional wireline or wireless communication link configured to carry control messages between the CPE 100 and the dedicated communication system 201. In other examples of the invention, human operators using a graphical user interface (not shown), could send the control messages to the dedicated processing system 201. The call processing system 202 is connected to the CPE 100 by a communication link 205. The communication link 205 could be a conventional wireline or wireless communication link configured to carry control messages between the CPE 100 and the call processing system 202. The interworking system 203 is connected to the CPE 100 by a communication link 204 and to the packet network 104 by a communication link 207. The communication link 204 could be any wireline or wireless communication link configured to exchange call traffic, such as voice, data and/or video communications between the CPE 100 and the interworking system 203. Some examples of the communication 204 include without limitation, a T-1 link, a T-3 link, and an integrated service digital network ("ISDN") link. The communication link 207 could be a conventional packet communication link that exchanges packet communications between the interworking system 203 and the packet network 104. The packet network 104 is connected to the CPE 105, the IP network 108 and the frame relay network 109 by conventional communication links.

Those skilled in the art will appreciate that in some embodiments of the invention the dedicated communication processing system 201, the call processing system 202, and the interworking system 203 could be a part of the same processing circuitry. Similarly, the dedicated communication processing system 201, the call processing system 202 and the interworking system 203 could comprise one or more CPU's as a matter of design choice. Those skilled in the art will also understand that the communication system 200 could include other conventional components not shown on FIG. 2 for clarity, and that communication links 204–206 could be combined into a single communication link, such as an ISDN communication link, which includes inband signaling and call traffic exchange.

The dedicated communication processing system 201 could be any device or group of devices configured to generate and transfer a first call setup message to the call processing system 202 to setup a dedicated communication path through the packet network 104. The dedicated communication processing system 201 also generates and transfers a first call release message for the call processing system 202 to break down and/or reconfigure the dedicated communication path through the packet network 104. It should be noted that unlike a conventional call setup, however, the dedicated communication path remains setup until a customer desires reconfiguration or cancels the dedicated service. Thus, the dedicated communication path is "nailed up," as it is sometimes referred to in the art, until the customer requests a reconfiguration or cancellation that triggers the first call release message to be generated for the call processing system 202.

The call processing system 202 could be any device or group of devices configured to receive and process the first call setup message from the dedicated communication system 201 to select a first identifier and generate and transfer a first instruction indicating the first identifier and a dedicated communication for the interworking system 203. The call processing system 202 also receives and process a second call setup message from the CPE 100 to select a second identifier and generates and transfers a second instruction indicating the second identifier and a switched communication for the interworking system 203.

The interworking system 203 could be any device or group of devices configured to receive the first instruction, the second instruction, and a bundled communication including the dedicated communication and the switched communication form the CPE 100. In response to the first instruction, the interworking system 203 separates the dedicated communication from the switched communication and converts the dedicated communication into first packets that include the first identifier. In response to the second instruction, the interworking system 203 converts the switched communication into second packets that include the second identifier and transfers the first packets and the second packets over the packet network 104.

The first identifier and the second identifier could be any identifier that identifies to the packet network 104 a destination for the dedicated communication and the switched communication. For example the first identifier could be an address or virtual connection for the CPE 105. The first identifier could also be the address or virtual connection for the IP network 104 or the frame relay network 109, depending on the dedicated service subscribed to by the customer at CPE 100. Similarly, the second identifier could be an address or virtual connection for a called party (not shown) for a switched voice conversation, data transmission, and/or video communication over the packet network 104.

The dedicated communication could be any non-switched communication over a bandwidth allocation exclusively dedicated for a customer's use. Some examples of the dedicated communication include without limitation, voice, video and data over a private line, frame relay network, or an IP network. The switched communication could be any non-dedicated switched communication over a bandwidth allocation not exclusively dedicated for the customer's use. Some examples of the switched communication include without limitation voice, video and/or data communications.

Figure 3:
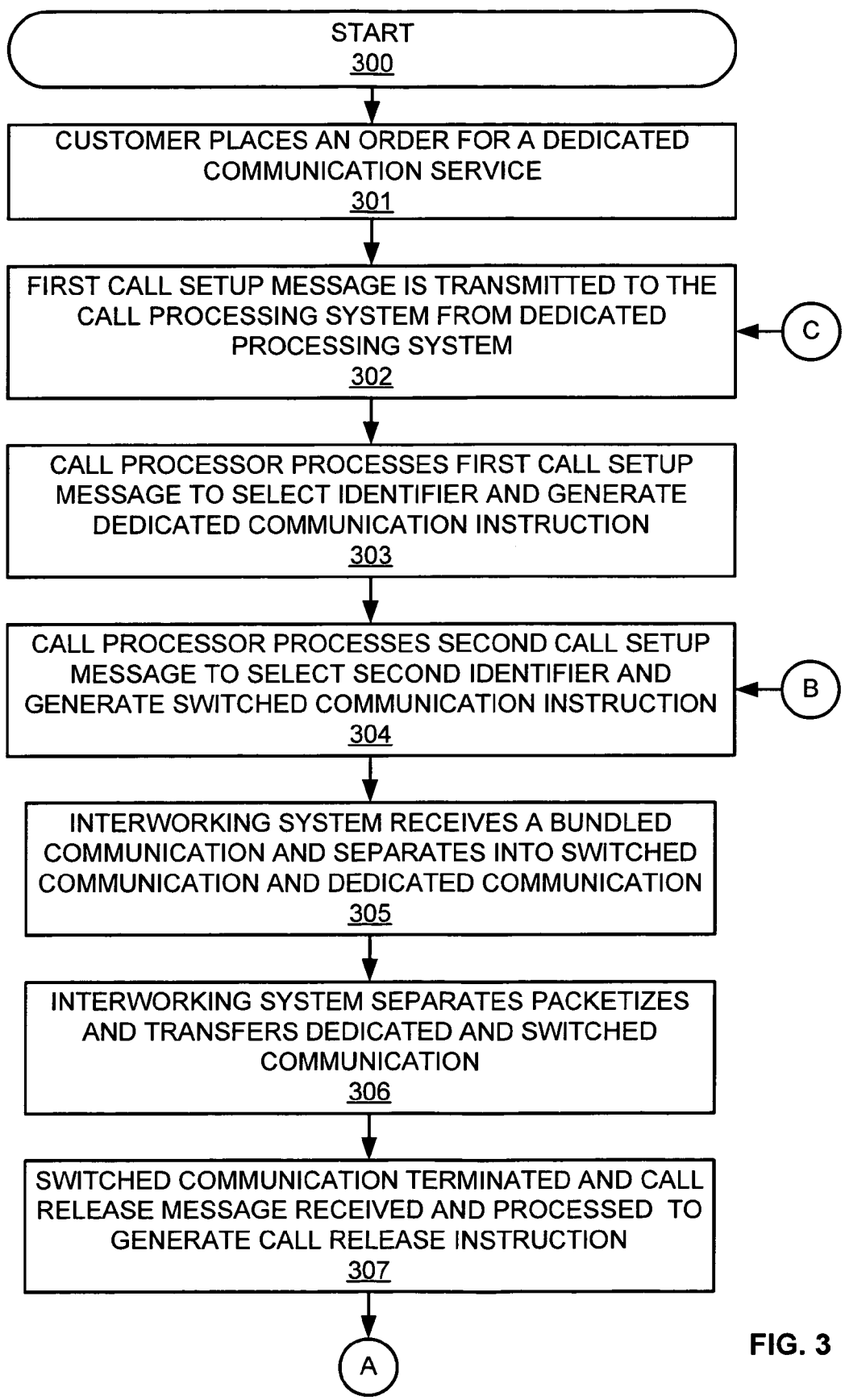
FIGS. 3–4 are a flowchart illustrating an example of the operational steps for a communication system according to the present invention.
Figure 4:
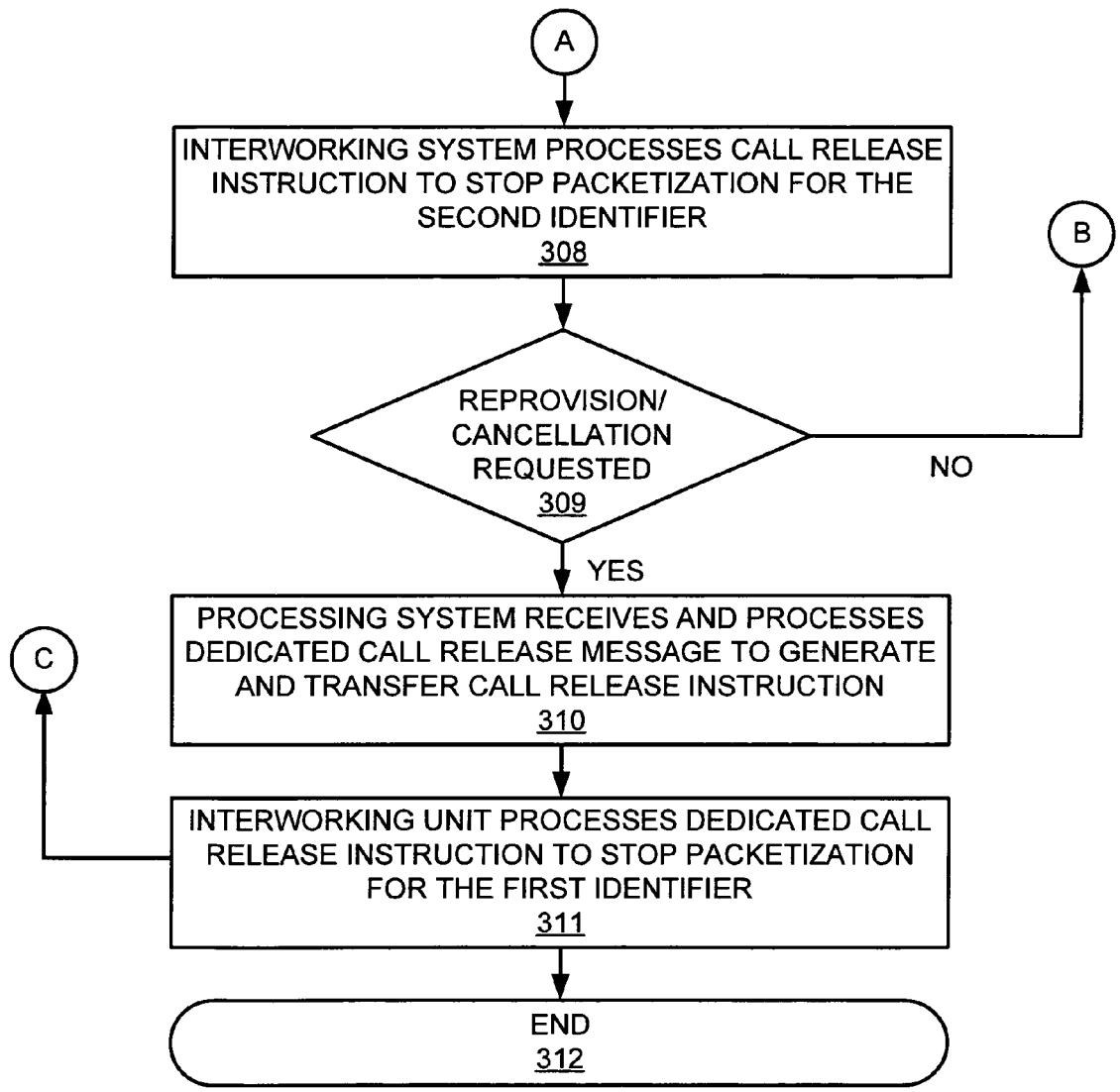

System Operation FIGS. 3–4:

FIGS. 3 and 4 are a flow chart illustrating an example of the operation of the communication system 200. On FIG. 3 the operation begins at step 300. At step 301, a customer at CPE 100 places an order over the communication link 206 for a dedicated communication service with a carrier operating the communication system 200. At step 302, a first call setup message is generated by the dedicated communication processing system 201 in response to the customer order and is transmitted to the call processing system 202. Examples of the call setup message include without limitation, a signaling system 7 initial address message ("IAM"), an ISDN set up message, a GR 303 set up message, a B-ISDN signaling message, an asynchronous transfer mode ("ATM") message or an ATM voice over internet protocol ("VoIP") message.

At step 303, the call processing system 202 receives the call setup message from the dedicated processing system 201 and processes the call setup message to select a first identifier and generates a first instruction for the interworking system 203. The first instruction indicates to the interworking system 203 the first identifier and the dedicated communication.

At step 304, the call processing system 202 receives a second call setup message from the CPE 100. The call processing system 202 processes the second call setup message to select a second identifier and generates a second instruction for the interworking system 203. The second instruction indicates to the interworking system 203 the second identifier and a switched communication. At step 305, the interworking system 203 receives a bundled communication from the CPE 100 that includes the dedicated communication and the switched communication and separates the bundled communication into the switched communication and the dedicated communication. At step 306, the interworking system 203 in response to the first instruction packetizes the dedicated communication into first packets that include the first identifier. Also at step 306, the interworking system 203, in response to the second instruction packetizes the switched communication into second packets that include the second identifier, and transfers the first and second packets over the packet network 104. At step 307, the switched communication is terminated and the call processing system 202 receives a call release message from one of the CPE 100 or the packet network 104. Also at step 307, the call processing system 202 processes the call release message to generate and transfer a call release instruction to the interworking system 203. At step 308, the interworking system 203 processes the call release instruction to stop packetization for the second identifier.

If no customer request for cancellation or reprovisioning of the dedicated communication service are received at step 309, processing continues at step 304 and steps 304–309 are repeated to handle both dedicated communications and switched communications. If a customer request for cancellation or reprovisioning of the dedicated communication service is received at step 309, processing continues at step 310. At step 310, the dedicated processing system 201 generates a call release message and transmits the call release message to the call processing system 202. The call processing system 202 processes the call release message to generate a call release instruction and transmits the call release instruction to the interworking system 203. At step 311, the interworking system 203 processes the call release instruction to stop packetization for the first identifier. If the customer request is for a cancellation the processing ends at step 312. If the customer request is for a reprovisioning of the bandwidth allocation at step 309, then processing continues at step 302 and another call setup message is generated by the dedicated processing system 201 to setup the new bandwidth allocation. Thus advantageously, the dedicated communication path is nailed up for the dedicated communication service until the customer requests a reprovisioning or cancellation of the dedicated communication service.

Figure 5:
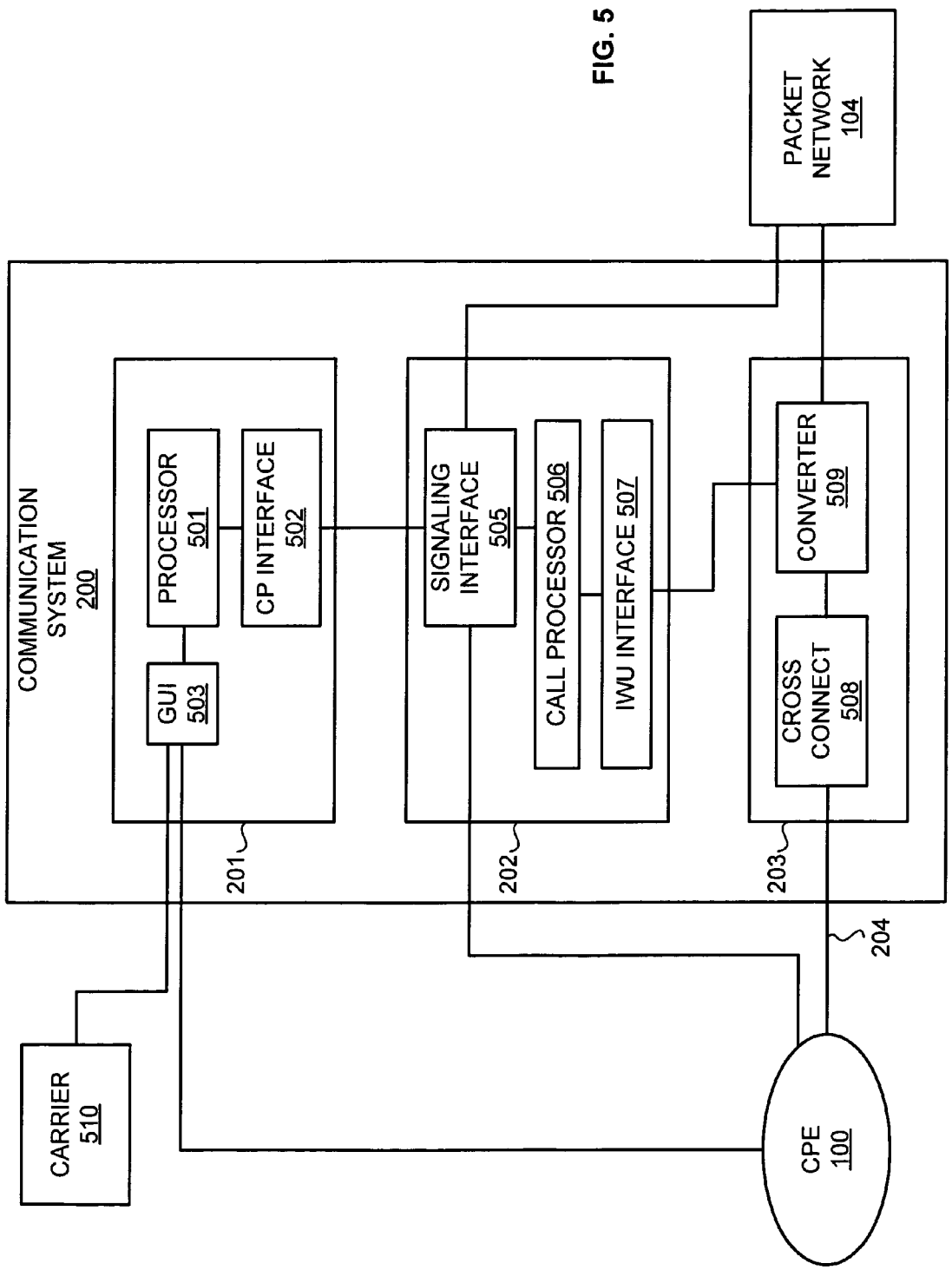
FIG. 5 illustrates an example of a system configuration for a communication system according to the present invention.

System Configuration FIG. 5:

FIG. 5 illustrates another example of the communication system 200 of the present invention. Those skilled in the art will appreciate numerous variations that do not depart from the present invention. Those skilled in the art will also appreciate that various features described below could be combined with the above described embodiment to form multiple variations of the invention.

FIG. 5 depicts the communication system 200, the CPE 100 and a carrier 510. The communication system 200 comprises the dedicated processing system 201, the call processing system 202 and the interworking system 203. The dedicated processing system 201 comprises a graphical user interface ("GUI") 503, a processor 501 and a call processor ("CP") interface 502. The call processing system 202 comprises a signaling interface 505, a call processor 506 and an interworking system interface ("IUW") 507. The interworking system 203 comprises a digital cross connect 508 and a converter 509.

The dedicated processing system 201 could be any processing system that receives user instructions for the setup, breakdown and/or reconfiguration of dedicated communication paths. The user instructions could be received from the carrier 510 or from the customer at CPE 100. The user instructions are received in the dedicated processing system 201 by the GUI 503 and provided by the GUI 503 to the processor 501. The GUI 503 could be any GUI that permits customers to control, rearrange and switch dedicated communication bandwidth allocations and services using a computer terminal to transmit instructions to the GUI 503. The GUI 503 could also receive user instructions from the carrier 510. For example, the customer at CPE 100 could call the carrier 510 and have an attendant at the carrier 510 rearrange or switch a dedicated communication service or bandwidth allocation using the GUI 503.

The dedicated processing system 201 processes the instructions using the processor 501 to nail up the dedicated communication paths through the interworking system 203 similar to the call setup for a dialed number. For example, during installation the communication path 204 could be provisioned as a trunk group between the CPE 100 and the interworking system 203. The dedicated processing system 201 could use the trunk group designations in the call setup message to establish a bandwidth allocation for a dedicated communication path through the interworking system 203 using the call processing system 202. Similarly, upon a request for service cancellation or a reprovisioning of the bandwidth allocation, the dedicated processing system 201 could use a call release message and another call setup message to stop packetization for the dedicated communication path and/or reallocate bandwidth for a new dedicated communication path or service.

In operation, the processor 501 receives the user instructions from the GUI 503 and processes the user instructions to generate and transmit the call setup messages and call release messages to setup and reconfigure dedicated communication paths. The processor 501 uses the CP interface 502 to provide the call setup and call release messages to the call processing system 202.

The call processing system 202 receives the call setup and call release messages from the dedicated processing system 201 using the signaling interface 505. The call processing system 202 processes the call setup and call release messages in the call processor 506 to generate control messages for the interworking system 203. The call processing system 202 also receives call setup messages for switched communications from the CPE 100 and/or the packet network 104 depending on the call direction. The call processing system 202 processes the call setup messages using the call processor 506 to generate control messages for the interworking system 203. The call processing system 202 could also receive call release messages from the packet network 104 and/or the CPE 100. The call processing system 202 processes the call release messages using the call processor 506 to generate control messages for the interworking system 203. The call processing system 202 uses the signaling interface 505 to exchange messages with the dedicated processing system 201 and the packet network 104. The call processing system 202 uses the IWU interface 507 to exchange the control messages with the interworking system 203.

The interworking system 203 could be a controllable asynchronous transfer mode ("ATM") matrix that exchanges ATM formatted user communications or call signaling. The interworking system 203 has access to virtual path/virtual channels (VP/VCs) over which it connects calls. For example a call can come in from the CPE 100 and be connected through the interworking system 203 in response to the control messages from the call processing system 202. Alternatively, a call can be connected in the opposite direction. The interworking system 203 uses the cross connect 508 to provide cross connect functionality in response to the control messages from the call processing system 202. Some examples of the cross connect functionality include without limitation, receiving communications in the DS3 format and demultiplexing to the DS1 format and the DS0 format. In some examples of the invention, the cross connect 508 could receive user communications in the ISDN format or the GR-303 format and convert the user communications to the DS0 format. In addition the cross connect could also transmit user communications in like manner to the CPE 105.

The converter 509 is operational to receive the user communications from the cross connect 508, convert the communications into packets and transmit the communications to the packet network 104. The converter 509 also receives packet communications from the packet network 104 and converts the packets into the user communication format and transmits the communications to the CPE 100.

One example of the converter 509 is an ATM adaptation layer (AAL) that comprises both a convergence sublayer and a segmentation and reassembly sublayer and is configured to convert between the digital signal level format and the ATM format. AALs are known in the art, and information about AALs is provided by International Telecommunications Union (ITU) documents in the series of I.363, which are incorporated herein by reference.

Figure 6:
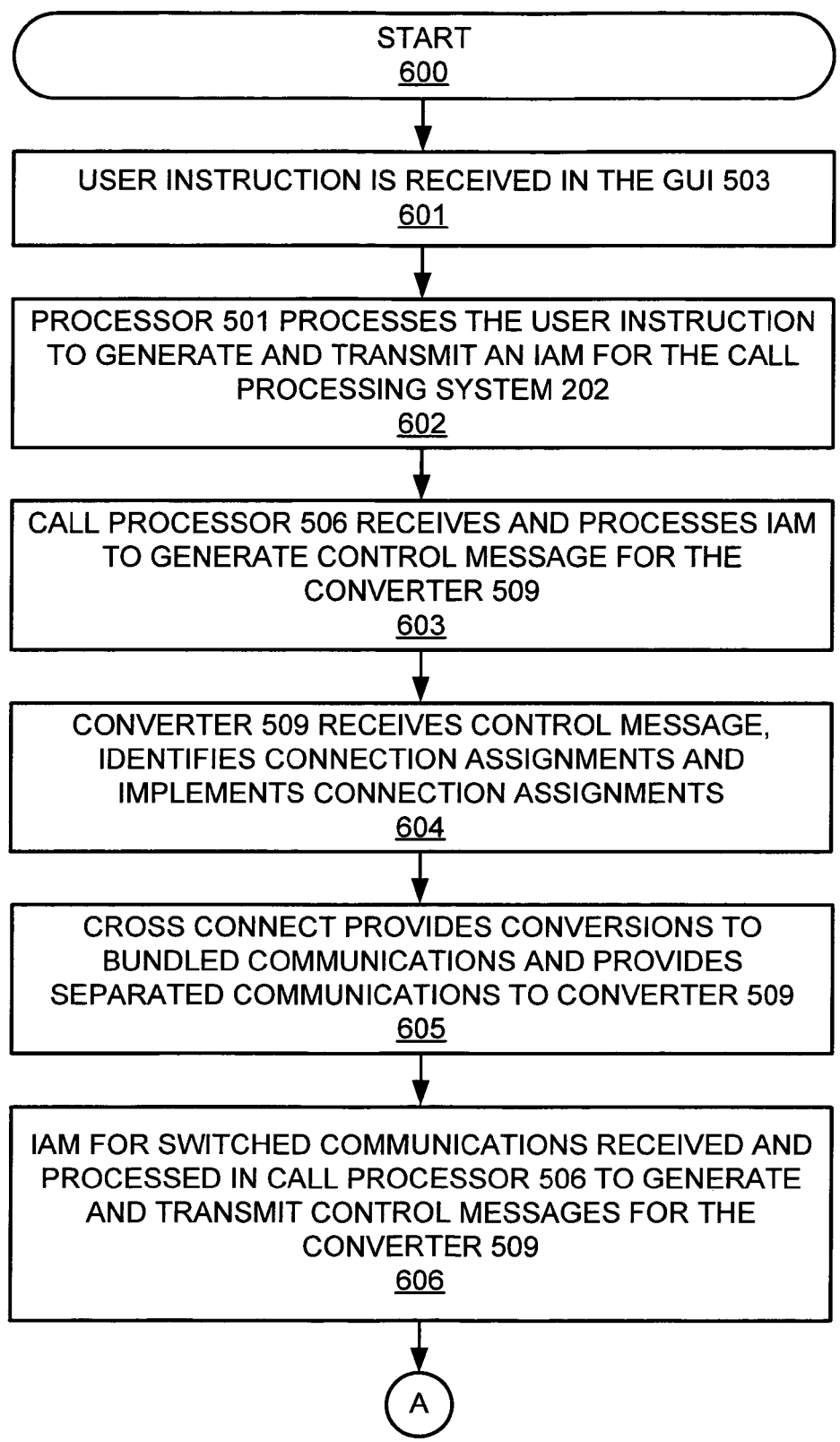
FIGS. 6–7 is a flow chart illustrating another example of the operational steps for a communication system according to the present invention.
Figure 7:
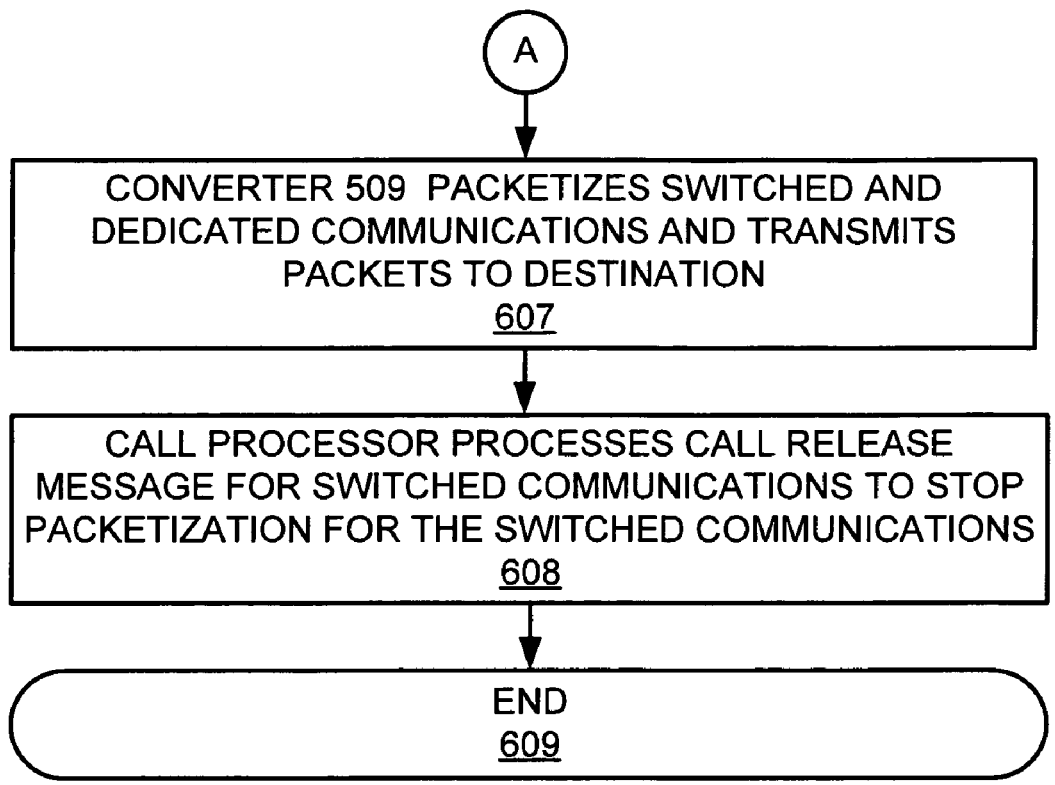

System Operation FIGS. 6–7:

FIG. 6 is a flow chart illustrating another example of the operation of the communication system 200. On FIG. 6 the operation begins at step 600. At step 601, a user instruction is received in the GUI 503. The user instruction includes a request for an allocation of bandwidth for a dedicated communication service and could be received from the customer at the CPE 105 or from the carrier 510. At step 602, the processor 501 processes the user instruction to generate an IAM message for the call processing system 202 and transmits the IAM to the call processor 506 using the CP interface 502 and the signaling interface 505. The IAM message includes a trunk group designation corresponding to the requested bandwidth allocation to implement the private line over particular VP/VC circuits. The IAM message also includes the type and destination of the dedicated communication for the call processor 506. For example, a private line, frame relay, or IP dedicated communication and the corresponding address or virtual connection for the CPE 105, IP network 108 and/or frame relay network 109. At step 603, the call processor 506 receives the IAM message from the processor 501, and processes the IAM message to generate a control message for the converter 509. The control message includes the connection assignments to implement the VP/VC circuits. At step 604, the converter 509 receives the control messages from the call processor 506, identifies the virtual connection assignments in the control messages, and implements the assignments to provide dedicated communications between CPE 105 and the destination virtual connection or address. At step 605, bundled switched and dedicated communications are received from the CPE 105 in the cross connect 508. The cross connect 508 provides the appropriate conversions to the bundled communication and provides the bundled communications to the converter 509. Substantially simultaneously, IAM messages for the switched communications are received in the signaling interface 505 and are processed in the call processor 506 to generate control messages for the converter 509 at step 606. At step 607, the converter 509 receives the communications and packetizes the switched communications and transmits the switched packets to their destination address according to the control message for the switched communications from the call processor 506. The converter 509 also receives the dedicated communications and transmits the dedicated communications to their destination address according to the control messages from the call processor 506. At step 608, a call release message for a switched communication is received in the signaling interface 505 from one of the packet network 104 and the CPE 105. The call release message is processed in the call processor 506 to stop packetization of the switched communications and processing ends at step 609. It should be noted that the dedicated communication path remains nailed up until another user instruction is received in GUI 503 requesting a reconfiguration or cancellation of the dedicated service. Only at this time is a call release message generated and provided by the dedicated processing system 201 to tear down the dedicated communication path.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

I claim:

1. A method of operating a communication system comprising:
   in a first processing system, receiving an instruction from a user through a Graphical User Interface (GUI), and in response, generating and transferring a first signaling message;
   in a second processing system, receiving and processing the first signaling message to select a first identifier for routing a first user communication over a packet network and generating and transferring a first control message indicating the first identifier;
   in an interworking unit, receiving the first control message and the first user communication, and in response, interworking the first user communication into first user packets having the first identifier and transferring the first user packets to the packet network;
   in the second processing system, receiving a second signaling message from the user and processing the second signaling message to select a second identifier for routing a second user communication over the packet network and generating and transferring a second control message indicating the second identifier; and
   in the interworking unit, receiving the second control message and the second user communication, and in response, interworking the second user communication into second user packets having the second identifier and transferring the second user packets to the packet network.

2. The method of claim 1 further comprising, in the first processing system, generating the GUI to receive the instruction from the user.

3. The method of claim 1 wherein receiving the instruction in the first processing system from the user through the GUI comprises receiving the instruction from a user device that is operated by the user and that displays the GUI.

4. The method of claim 1 wherein receiving the instruction in the first processing system from the user through the GUI comprises receiving the instruction from a communication system operator in communication with the user.

5. The method of claim 1 wherein the first user communication comprises a dedicated communication and the second user communication comprises a switched communication.

6. The method of claim 1 wherein the first user communication comprises a data communication and the second user communication comprises a voice communication.

7. The method of claim 1 wherein the second user communication comprises a voice over internet protocol communication.

8. The method of claim 1 wherein the first identifier comprises a first internet protocol address and the second identifier comprises a second internet protocol address.

9. The method of claim 1 wherein receiving the first user communication and the second user communication in the interworking unit comprises receiving the first user communication and the second user communication over the same link and separating the first user communication from the second user communication.

10. The method of claim 1 wherein the second signaling message comprises a voice over internet protocol signaling message.

11. A communication system comprising:
   a first processing system configured to receive an instruction from a user through a Graphical User Interface (GUI), and in response, generate and transferring a first signaling message;
   a second processing system configured to receive and process the first signaling message to select a first identifier for routing a first user communication over a packet network and to generate and transfer a first control message indicating the first identifier;
   an interworking unit configured to receive the first control message and the first user communication, and in response, interwork the first user communication into first user packets having the first identifier and transfer the first user packets to the packet network;
   the second processing system configured to receive a second signaling message from the user and process the second signaling message to select a second identifier for muting
   a second user communication over the packet network and to generate and transfer a second control message indicating the second identifier; and
   the interworking unit configured to receive the second control message and the second user communication, and in response, interwork the second user communication into second user packets having the second identifier and transfer the second user packets to the packet network.

12. The communication system of claim 11 wherein the first processing system is configured to generate the GUI to receive the instruction from the user.

13. The communication system of claim 11 wherein the first processing system is configured to receive the instruction from a user device that is operated by the user and that displays the GUI.

14. The communication system of claim 11 wherein the first processing system is configured to receive the instruction from a communication system operator in communication with the user.

15. The communication system of claim 11 wherein the first user communication comprises a dedicated communication and the second user communication comprises a switched communication.

16. The communication system of claim 11 wherein the first user communication comprises a data communication and the second user communication comprises a voice communication.

17. The communication system of claim 11 wherein the second user communication comprises a voice over internet protocol communication.

18. The communication system of claim 11 wherein the first identifier comprises a first internet protocol address and the second identifier comprises a second internet protocol address.

19. The communication system of claim 11 wherein the interworking unit is configured to receive the first user communication and the second user communication over the same link and to separate the first user communication from the second user communication.

20. The communication system of claim 11 wherein the second signaling message comprises a voice over internet protocol signaling message.

* * * * *